(12) United States Patent
Bienn et al.

(10) Patent No.: US 7,436,817 B2
(45) Date of Patent: Oct. 14, 2008

(54) CALL CLEARING FOR LEGACY MOBILE CIRCUIT SWITCHED DOMAIN WIRELESS SYSTEMS

(75) Inventors: Marvin Bienn, Dallas, TX (US); Jayshree A. Bharatia, Plano, TX (US); Amy Pendleton, Dallas, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 980 days.

(21) Appl. No.: 10/326,324

(22) Filed: Dec. 20, 2002

(65) Prior Publication Data

US 2003/0169729 A1    Sep. 11, 2003

Related U.S. Application Data

(60) Provisional application No. 60/362,613, filed on Mar. 8, 2002.

(51) Int. Cl.
*H04L 12/66*   (2006.01)
(52) U.S. Cl. .................. 370/352; 370/401; 370/466; 370/467
(58) Field of Classification Search ........... 370/352, 370/353, 354, 355, 356, 401, 466, 467
See application file for complete search history.

(56) References Cited

U.S. PATENT DOCUMENTS

| | | | | |
|---|---|---|---|---|
| 6,490,451 | B1* | 12/2002 | Denman et al. | 455/436 |
| 6,693,897 | B1* | 2/2004 | Huang | 370/352 |
| 6,735,175 | B1* | 5/2004 | Havens | 370/236 |
| 6,741,695 | B1* | 5/2004 | McConnell et al. | 379/229 |
| 6,785,264 | B1* | 8/2004 | Borden et al. | 370/352 |
| 6,791,988 | B1* | 9/2004 | Hameleers et al. | 370/401 |
| 6,879,680 | B2* | 4/2005 | Donovan et al. | 379/220.01 |
| 6,950,441 | B1* | 9/2005 | Kaczmarczyk et al. | 370/467 |
| 6,996,087 | B2* | 2/2006 | Ejzak | 370/338 |
| 7,068,598 | B1* | 6/2006 | Bryson et al. | 370/230 |
| 7,075,918 | B1* | 7/2006 | Kung et al. | 370/352 |

(Continued)

OTHER PUBLICATIONS

Cuervo, F., et al., IETF RFC 3015, Megaco Protocol Version 1.0, Memo, Nov. 2000, Nortel Networks, Microsoft Corporation, Marconi, Lucent Technologies, USA.

(Continued)

*Primary Examiner*—Wing F. Chan
*Assistant Examiner*—Mark A. Mais
(74) *Attorney, Agent, or Firm*—Carr LLP (57) ABSTRACT

A telecommunications system having a first PS network, second PS network and a third circuit-switched core network includes a system for terminating a legacy domain circuit-switched communication upon receipt of a trigger signal requesting termination of communication. The system includes first and second functional entities in each network. The first and second functional entities of the first network can communicate signals over an interface using a PS protocol. The first and second functional entities of the second network can communicate signals over an interface using a PS protocol. The first functional entity of the first network can communicate packet data to and from the first functional entity of the second network. The second functional entity of the first network communicates a PS protocol signal to the second entity of the second network, which then communicates a circuit-switched protocol signal to and from the third circuit-switched protocol core network to terminate the circuit-switched communication.

32 Claims, 3 Drawing Sheets

U.S. PATENT DOCUMENTS

| | | | |
|---|---|---|---|
| 7,085,260 B2 * | 8/2006 | Karaul et al. | 370/352 |
| 7,139,263 B2 * | 11/2006 | Miller et al. | 370/352 |
| 7,142,534 B1 * | 11/2006 | Whent et al. | 370/352 |
| 7,218,722 B1 * | 5/2007 | Turner et al. | 379/221.02 |
| 7,257,109 B2 * | 8/2007 | Sylvain | 370/352 |
| 2002/0159439 A1 * | 10/2002 | Marsh et al. | 370/352 |
| 2003/0007496 A1 * | 1/2003 | Brown et al. | 370/401 |

OTHER PUBLICATIONS

Qwest, Aparna Vemuri, et al., IETF draft-ietf-sipping-sipt-oo.txt SIP for Telephones (SIP-T): Context and Architectures, Internet Draft, Nov. 2001, NeuStar, Inc., Sterling, Virginia, USA.

TIA/EIA/IS-2001-A Inter-Operability Specification (IOS) for CDMA 2000 Access Network Interfaces, Jun. 2001, Telecommunications Industry Association/Electronic Industries Alliance, Arlington, Virginia, USA.

TIA/EIA-41.3-D, Cellular Radiotelecommunications Intersystem Operations: Chapter 3 Automatic Roaming Information Flows, Dec. 1997, Chapter 3, Telecommunications Industry Association/Electronic Industries Alliance, Arlington, Virginia, USA.

Rosenberg, Jonathan, et al., IETF draft-ietf-sip-rfc2543bix-07.txt, SIP: Session Initiation, Internet Draft, Feb. 4, 2002, Internet Engineering Task Force, Reston, Virginia, USA.

* cited by examiner

CALL CLEARING FOR LEGACY MOBILE CIRCUIT SWITCHED DOMAIN WIRELESS SYSTEMS

CROSS-REFERENCED APPLICATION

This application relates to U.S. provisional patent application Ser. No. 60/362,613, filed Mar. 8, 2002, and entitled "Call Clearing for LMSD," the contents of which are incorporated by reference.

FIELD OF THE INVENTION

The present invention relates to call clearing in a mobile network while interworking between a legacy circuit-switched domain and a packet-switched domain.

BACKGROUND

In circuit-switched (CS) mobile telecommunications systems, a mobile station (MS) sends a signal or message, which is picked up by a base transmitting station (BTS) and then routed by a base station controller (BSC). The signal or message is forwarded by the BSC to an associated mobile switching center (MSC), for routing to the appropriate destination, for example, a public switched telephone network, PSTN, or other telecommunications node or network.

To increase multimedia and Internet capabilities, and for other reasons, most mobile telecommunications systems are being migrated from use of a circuit-switched core network to use of a packet-switched (PS) protocol network. Systems using a PS network nevertheless typically needs support for handling calls routed through non-PS systems (for example, PSTN). Ideally, support for existing mobile stations (MS's), for example, call initiation, call termination, in a PS signaling network environment will operate in a manner transparent to the user. Furthermore, ideally, such support should also permit supporting new features and capabilities. However, end users are often stymied by a lack of standardization to enable such migration from circuit-switched networks to packet-switched mobile networks to continue.

Therefore, what is needed is a method for call clearing between a circuit switched network and a PS network for communicating with a mobile station.

SUMMARY OF THE INVENTION

A telecommunications system is provided having at least a first PS network, a second PS network, a third circuit-switched core network, and a system for terminating a legacy domain circuit-switched communication upon receipt of a trigger signal requesting termination of communication. The system for terminating a legacy domain circuit-switched communication comprises a first functional and a second functional entity in each of the first and second networks, the first functional entity and the second functional entity of the first network including means for communicating signals over an interface using a PS protocol. The first functional entity and the second functional entity of the second network include means for communicating signals over an interface using a PS protocol, the first functional entity of the first network having means for communicating packet data to and from the first functional entity of the second network, the second functional entity of the first network having means for communicating a PS protocol signal to the second entity of the second network. The second functional entity of the second network further includes means for communicating a circuit-switched protocol signal to and from the third circuit-switched protocol core network to terminate the circuit-switched communication.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION

Figure 1:
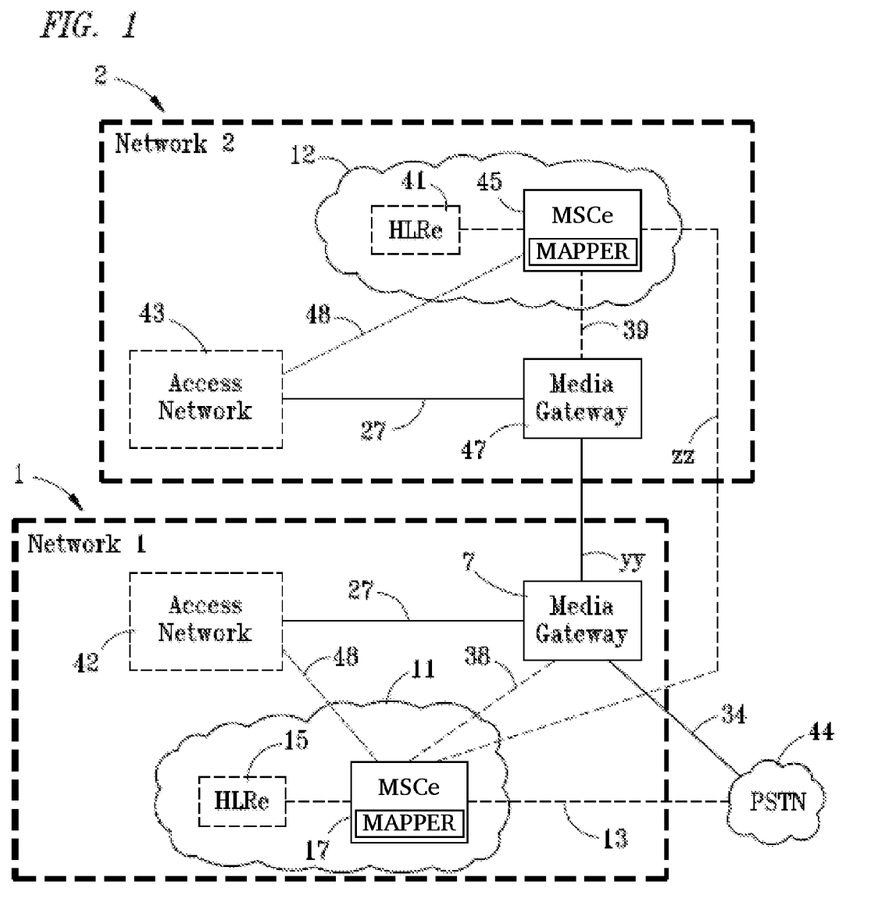
FIG. 1 is a functional block diagram depicting a PS network, having a Legacy Mobile Station Domain Support (LMSDS), in communication with another PS network having a LMSDS.

Turning now to FIG. 1, a system for handling circuit-switched operations in a telecommunications system having a PS network is depicted. In the following discussion, numerous specific details are set forth to provide a thorough understanding of the present invention. However, it will be obvious to those skilled in the art that the present invention can be practiced without such specific details. In other instances, well-known elements have been illustrated in schematic or block diagram form in order not to obscure the present invention in unnecessary detail. Additionally, for the most part, details concerning CDMA systems and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein are performed by a processor such as a computer or electronic data processor in accordance with code such as computer program code, software, and/or integrated circuits that are coded to perform such functions.

FIG. 1 illustrates first and second PS networks 1 and 2 in communication with one another across reference points yy and zz. Network 1 includes Legacy Mobile Station Domain Support (LMSDS) 11, which includes a home location register emulator (HLRe) 15 and a PS call control entity, such as a mobile switching control emulator (MSCe) 17. An LMSDS can be generally defined as support for allowing a standardized conversion between circuit-switched data and packet-switched data for transmission on a mobile network.

In FIG. 1, for forward and backward compatibility purposes (for example, to allow PS performance in telecommunications services without sacrificing the requirement for the transparent handling of legacy circuit-switched MS calls), the functionality of a circuit-switched MSC is divided into two functionally distinct entities. One functionally distinct entity is the MSCe 17, which is responsible for call signaling, both for packet and non-packet communications. Signaling can be generally defined as the determination of the routing path from one entity to another entity. Another functionally distinct entity is the MGW 7, which is responsible for the transmission of the bearer traffic. Bearer traffic can be generally defined as the data that is routed by the signaling. The MSCe 17 is the control entity that converts non-PS call signaling (for example, PSTN) to PS call signaling (and vice-versa), and controls the call routing through the PS network 1 and interacts with the MGW 47 of the network 2.

The division of functions into separate functional entities separated by a PS protocol interface facilitates the use of open standards for managing traffic and signals in a PS environment, such as Megaco, SIP, IOS, and circuit-switched signal protocols such as SS7. The present invention facilitates specific functionality within the MSCe, between the MSCe and the MGW and among other MSCe's on other networks. In FIG. 1, network 2 has the LMSDS 12, which includes an HLRe 31, and an MSCe 45, which controls its MGW 47.

The MGW 7 has an interface between the packet environment of the PS network 1 and the circuit switched environment of the PSTN 44 for bearer traffic, when equipped with circuit capabilities. The MGW 7 can provide vocoding and/or transcoding functions to the bearer traffic. The MGW 7 can also provide modem functions to convert digital byte streams to and from audio modem tones placed on circuits, and can provide the capability to terminate Point-to-Point Protocol (PPP) connections. It also provides policy enforcement relative to its activities and resources.

The MGW 7 supports the bearer aspects and bearer switching fabric, tone, announcement and bridging capabilities. In addition, the MGW 7 supports the PS bearer for actual call delivery to other LMSDS's across reference point/interface yy and provides bearer support for connectivity to the PSTN 44. The MGW 7 can use PS protocol signaling from the MSCe 17 for tones and announcements control, for bearer establishment and bridging control functions. In FIG. 1, the LMSDS 11 is employable to provide support for the following interfaces; MGW to radio access network (RAN) voice bearer (27), MGW to RAN circuit data bearer (27), MGW to PSTN Bearer (34), MSCe 17 to MGW 7 signaling (39), and MGW to MGW PS bearer (yy). An access network, such as access network 42 or 43, can comprise a base station, and can be part of the RAN.

The MGW 7 also can have the following capabilities: It terminates bearer channels from the PSTN 44 on interface 34, bearer channels from the radio network on interfaces 27 and media streams from a packet network on interface yy; it supports voice and circuit data media streams on these network terminations; it provides switching of the bearer channels by connecting media streams from one set of network terminations to another set of network terminations; and it converts media in one type of network termination to the format required in another type of network termination.

The MGW 7 has the ability to connect to the PS protocol environment of another PS network, for example, network 2, as well as the circuit-based environment of the PSTN 44. Therefore, the resources provided by the MGW 7, including transcoding resources, can be used to support bearer channels that are contained entirely within the PS environment.

The MGW 7 supports conversion of a non-PS traffic bearer to a PS traffic bearer and transports the PS traffic bearer to the final destination and vice versa. In other words, the MGW 7 performs the actual encapsulation between circuit-switched data to packet-switched data, and the MSCe 15 performs the mapping of the routing information between circuit-switched data and packet-switched data. To perform its functions, the MSCe 17 can be capable of communicating with the PSTN network using circuit-switched communications protocols and with an MGW 7 and MGW 47 (for example, through employment of a device control protocol, such as the Megaco protocol), and with Home Location Registers/Visiting Location Registers (for example, using TIA/EIA-41 protocols).

The LMSDS 11 includes network entities HLRe 15, which functions as a home location register emulator, and MSCe 17, which functions as a mobile switching control emulator. Network 1, with its included network entities, and their associated reference points, comprises a wireless PS network. Network 2, with its included network entities, and their associated reference points, also comprises a wireless PS network. The entities HLRe's 15, 41, MSCe's 17, 45 and MGW's 7, 47, and reference points/interfaces 38,39, yy, and zz can employ communication protocols based on existing open-standards.

The MSCe 17 and MSCe 45 further have an interworking function or interworking engine. Generally, the interworking engine is employable as a command center mapping of routing information within the MSCe when transmitting data from a circuit-switched network to a packet-switched network. For the purposes of mapping, there can be an interworking engine in the MSCe's of both network 1 and network 2.

The network architecture model depicted in FIG. 1 is a functional block diagram. As used herein, a network entity represents a group of functions, not necessarily a physical device. The physical realization is an implementation issue. A manufacturer can choose a physical implementation of network entities, either individually or in combination, as long as the implementation meets the functional requirements. Sometimes, for practical reasons, the functional network entity is a physical device. The Mobile Station (MS) is an example of a functional entity that is also a physical device.

As used herein, a reference point is a conceptual point that divides two groups of functions. It is not necessarily a physical interface. A reference point can become a physical interface when the network entities on either side of it are contained in different physical devices. A reference point or interface could be standardized, but not necessarily. A reference point exists when two network entities are interconnected through one signaling or bearer stream point. Reference points identify that a logical relationship exists between two network entities. An interface is generally defined across a specific reference point by defining the protocol and data exchanged between the entities. One or more interfaces can be defined for each reference point in the LMSDS system. The points/interfaces 38, 39, yy, zz can employ communications protocols based on existing open-standards.

The LMSDS system 11 comprises a collection of the network entities, the HLRe 15 and the MSCe 17. The LMSDS system 11 can support interfaces using open-standards signal communications protocols at the indicated reference points. These can be the ANSI-41 network signaling, PSTN signaling, media gateway signaling, radio access network signaling, and LMSDS system signaling.

The LMSDS system 11 has the capability of processing mobility management and call control messages from the ANSI-41 network and mobile stations for mobile originated and mobile terminated calls. It controls the establishment of voice bearers between access network 42 and MGW 7, and between access network 43 and MGW 47. The LMSDS 11 and LMSDS 12 also are responsible for establishment of voice bearers between MGW 7 and PSTN 44 and emulate the functionality of the HLRe's 15 and 41, respectively. If requested, the LMSDS 11 performs authentication of mobile stations, and performs call delivery to another LMSDS 12 of network 2 across reference point zz, using an open-standards PS protocol, such as SIP.

The LMSDS system 11 and 12 perform the call control, mobility management and service management functions to provide support for non-PS (that is, legacy) mobile station networks. The LMSDS systems 11 and 12 are responsible for the control of call origination and call termination of both the circuit and packet switched networks. The LMSDS 11 and 12 terminate the user-network signaling and convert it into the appropriate network-network signaling. The LMSDS 11 and 12 also control the connections for bearer channels in MGW 7 and connections to a base station controller (BSC) (not shown) in the access network 42.

The MSCe 17 is responsible for one or more call control functions. The MSCe 17 uses PS signaling to control the MGW 7 across reference point 39 and to allow the MGW 7 to communicate with MGW 47 of network 2 across reference point/interface yy. The MSCe 17 translates a received E. 164 number into an IP address when IP bearer is to be used.

The HLRe 15 is a network entity that supports non-PS Terminals (legacy MS's) in a PS network. The HLRe 15 can have a PS signaling interface. The HLRe 15 supports roaming to the other PS networks. The HLRe 15 also manages the subscriber profile for both voice services (for example, Call Forwarding, Three Way Calling, Message Waiting Notification) and data services (for example, Priority). Subscriber profile information can be accessed from the HLRe 15 or can be downloaded to a serving system as needed.

The HLRe 15 manages subscriber location and/or accessibility information. This includes updating the dynamic subscriber information database with current domain information (for example, MSCe address) and with MS status information (for example, SMS pending flag). The HLRe 15 also interacts with the location database to update or retrieve current location information.

The LMSDS 11 supports the following interfaces or reference points. The MGW to radio access network circuit data bearer (27) is supported. The MGW to PSTN bearer (34), MSCe 17 to MGW 7 signaling (38) and media gateway to media gateway PS bearer (yy) interface or reference points are also supported.

The MGW 7 is employable to provide one or more packet signal switching capabilities. In FIG. 1, the MGW can receive bearer channels from the PSTN on interface 34, bearer channels from the radio network on interfaces 27 and media streams from a packet network on interface yy. The MGW 7 also supports voice and circuit data media streams on these network terminations, provides switching of the bearer channels by connecting media streams from one set of network terminations to another set of network terminations, and converts media in one type of network termination to the format required in another type of network termination.

Open-standards signal communications protocols can be used across its reference points/interfaces. These include, for example, the media gateway control protocol (Megaco) and SIP, a packet-switched data control protocol. Using these standardized reference point/interfaces allow the interworking function to communicate with the PSTN and the MGW of the first mobile network with the entities of the second mobile network in a standardized manner using packet switched protocol.

Media gateway control protocol, also known as H.248 or Megaco, is an open-standards protocol for handling the signaling and session management needed during a multimedia conference. Megaco can be used to communicate signals between the MSCe and the MGW.

Session initiation protocol (SIP) is a request-response PS protocol that establishes call parameters at either end of the communication, and handles call transfer and termination. SIP can be employed when communicating between the MSCe 17 and the MSCe 45; that is, from the first mobile network to the second mobile network, along interface zz. SIP is an open-standards PS protocol and participants are identified by SIP URLs. Requests can be sent through any transport protocol, such as UDP, SCTP or TCP. SIP determines the end system to be used for the session, the communication media and media parameters, and the called party's desire to engage in the communication. Once these are assured, SIP establishes call parameters at either end of the communication, and handles call transfer and termination. SIP is also used for initiating an interactive user session that involves multimedia elements such as video, voice, chat, gaming, and virtual reality.

Like HTTP or SMTP, SIP works in the Application layer of the Open Systems Interconnection (OSI) communications model. The Application layer is the level responsible for ensuring that communication is possible. SIP can establish multimedia sessions or Internet telephony calls, and modify or terminate them. The protocol can also invite participants to unicast or multicast sessions that do not necessarily involve the initiator. Because the SIP supports name mapping and redirection services, it makes it possible for users to initiate and receive communications and services from any location, and for networks to identify the users wherever they are.

Interface yy is a PS bearer interface between MGWs operating using IP. Interface 38 is used for the MGW 7 to communicate to the MSCe 17. Interface 38 provides PS signaling, control bearer resource assignment and bridging from the MSCe 17 to the MGW 7.

Figure 2:
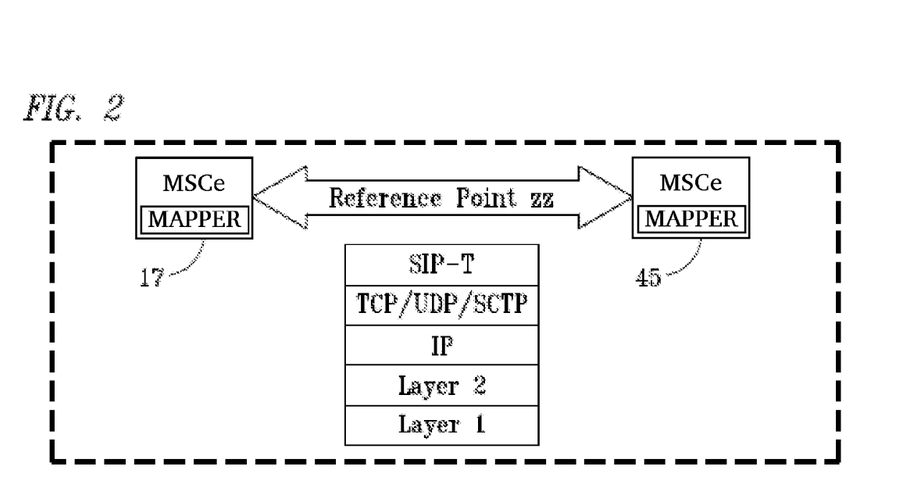
FIG. 2 is a block diagram depicting a protocol stack for reference point zz of FIG. 1.

Turning now to FIG. 2, illustrated is an OSI protocol stack for interface zz. Generally, the interworking engine of the MSCe 17 allows for the communication of signals from the interface 13 to the interface zz. Interface zz provides PS signaling control employed by the interface yy. This interface is between MSCes. Interface zz is a signaling interface that is based on SIP-T as defined in IETF-2 and IETF-3. SIP can employ either TCP as defined in IETF-5, UDP as defined in IETF-6 or SCTP as defined in IETF-4. IP as defined in IETF-7 is used as the network protocol. In FIG. 2, layer 1 represents the physical layer of the OSI protocol stack, and can be a wire, or can be wireless. Layer 2 represents data link layer. Layer 3 represents the network layer. It is within the layer 3 that the SIP is employed.

Figure 3:
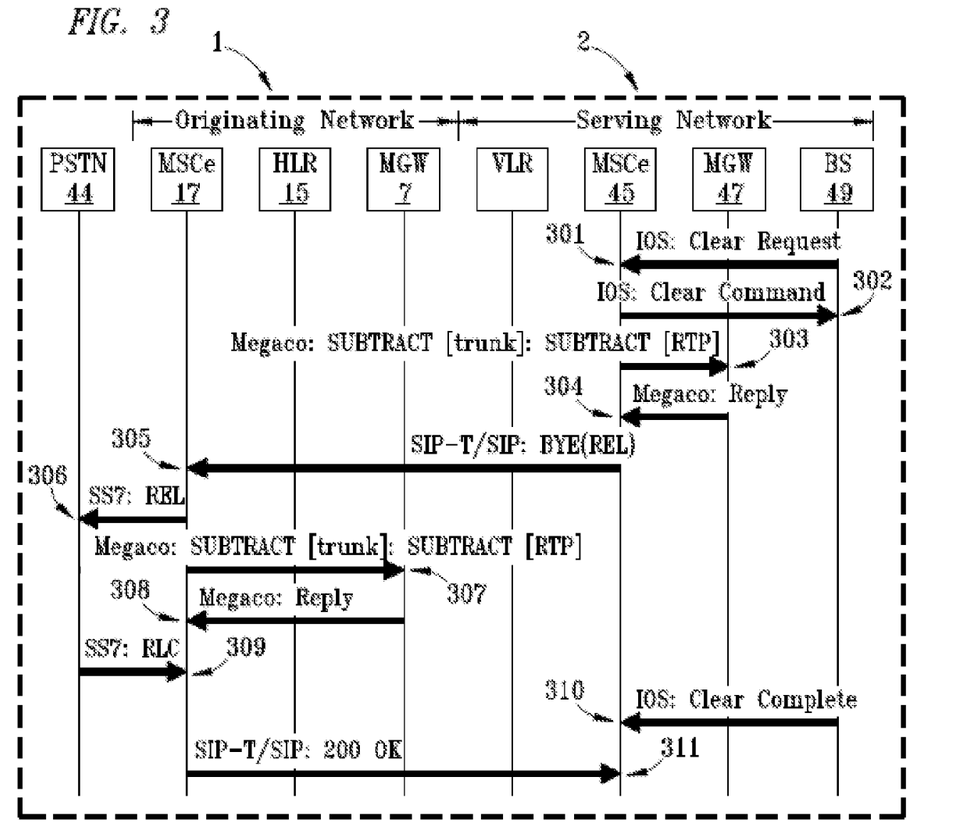
FIG. 3 is a node diagram depicting an example of call clearing initiated by the based station.

With reference now to FIG. 3, an example of call clearing that has been initiated by an MS will be described. In this example, an MS is outside the serving area of the MSCe 17 where the call originated. In the following, there are two PS core networks, a first network 1 and a second network 2. In this example, the first network 1 is the originating network (for example, the network receiving the call from the circuit switched (CS) network, such as the PSTN 44 in this example) and the second network 2 is the serving network (for example where the call is transmitted to BS), and a third network, which has a CS core, such as the PSTN 44 or other CS core network.

In step 301, the BS sends a Clear Request message per a PS protocol, can be a per a standard protocol, such as 3GPP2, to a serving MSCe. This message acts as a trigger to initiate a sequence of steps to clear the call transaction. It is assumed that, prior to this step, an MS (not shown) was in communication with the BS 49. The MS may also have transmitted a signal to the BS 49 to request that it initiate the call clearing sequence (such as by pushing "end"). The BS 49 may also initiate a Clear Request on its own (if a signal is lost, and so on.) or for other reasons. However, the reason the BS sends the Clear Request message is not material to the present invention.

In step 302, a Serving MSCe 45 sends a PS protocol message, which in this example is a Clear Command message per 3GPP2, to the BS to instruct the BS to release the associated dedicated resource, such as, the communication channel between the BS and the MS or other device.

As shown in step 303, the receipt of a Clear Request message by the Serving MSCe 45 from the BS 49 also triggers the serving MSCe 45 to send the serving MGW 47 (of the same network) message to clear the network communication channel using a PS protocol message. In this example, the PS protocol message is a Megaco device control format message consisting of two SUBTRACT commands per IETF-8. The first SUBTRACT command removes a termination to the BS communication channel (for example, DS0 on T1 or E1 line). The second SUBTRACT removes a termination for a bearer channel of the serving network to the originating using RTP.

In step 304, the Serving MGW 47 replies to the Megaco or other PS protocol message with a Reply acknowledging that the bearer channel has been terminated. In this example, this message is a Reply per IETF-8.

In step 305, the Serving MSCe 45 sends a message to the Originating MSCe 17 using a PS protocol, which is a BYE per IETF-2 message, including an REL per SS7 encapsulated within it.

In step 306, upon receiving a BYE message, an Originating MSCe 17 sends a message using a CS protocol to the PSTN 44 (or other CS network), which is a REL message per SS7.

In step 307, upon receiving the BYE message, the Originating MSCe 17 also sends the originating MGW 7 of its network a PS protocol device control format message, which is which in this example, is a Megaco message consisting of two SUBTRACT commands per IETF-8. The first SUBTRACT command removes a termination to a PSTN communication channel (for example, DS0 on T1 or E1 line). The second SUBTRACT removes a termination for a bearer channel using RTP.

In step 308, the originating MGW 7 replies to the PS protocol message (that is, the Megaco SUBTRACT commands, with a PS protocol Reply, which can be a Megaco Reply message.

In step 309, the CS network, in this case the PSTN 44, sends a CS protocol message, which is a RLC per SS7, to the Originating MSCe 17. Note this message can be received by an Originating MSCe 17 anytime after a REL message is sent (see Step 306). It is not necessary to wait for steps 307 and 308 to be performed.

In step 310, the BS 49 of the Serving Network 2 returns a PS protocol message, which is a Clear Complete message per 3GPP2-3, to the Serving MSCe 45. In response, the Serving MSCe 45 releases the underlying transport connection. Note this message can be received by a Serving MSCe 45 anytime after Step 302. It is not necessary to wait for steps 303 to 309 to be performed.

In step 311, upon receiving the PS protocol message, that is, the Reply message from the originating MGW 7 and upon receiving the RLC message from a PSTN 44, the originating MSCe 17 sends a 200 OK message per IETF-2 to Serving MSCe 45. This message acknowledges the BYE message (see Step 305).

Figure 4:
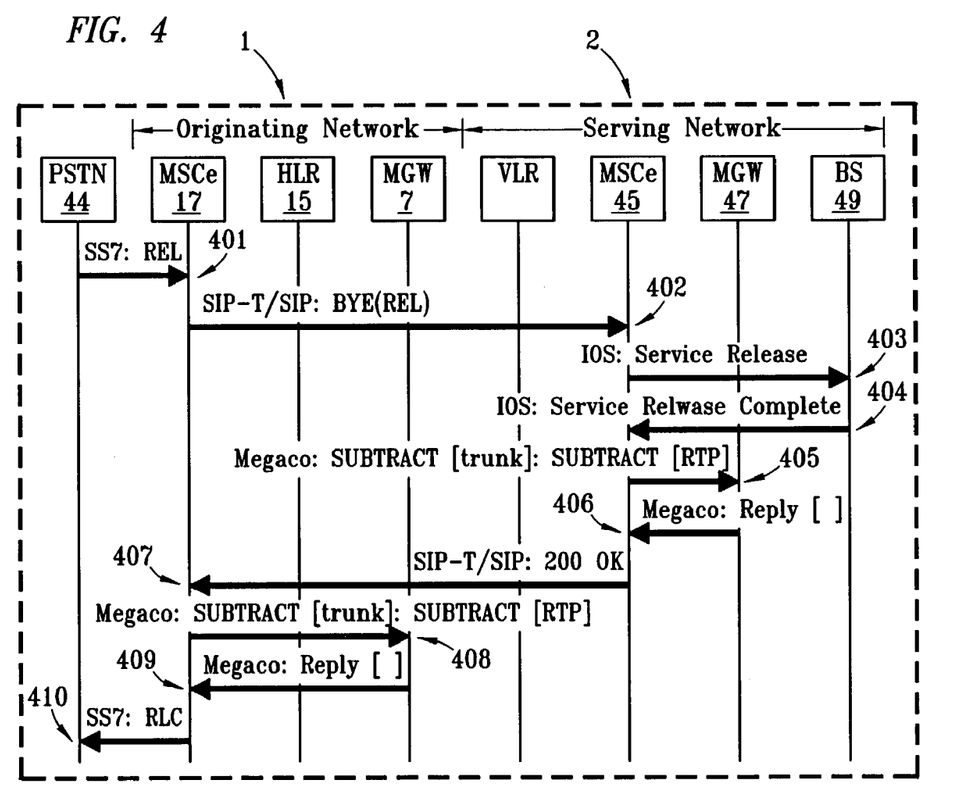
FIG. 4 is a node diagram depicting an example of call clearing initiated by a signaling message sent from the PSTN.

With reference now to FIG. 4, this scenario describes call clearing that has been triggered by a CS protocol request from the CS core network, such as the PSTN 44 in this example. In this example, the PSTN 44 sends an SS7 REL message, which is a CS protocol message, to the originating MSCe 17. In this example, the MS is outside the serving area of the MSCe 17 where a call originated, but this need not be the case.

In step 401, a CS protocol message is sent to the originating MSCe 17, which is a REL message per SS7. This initiates or triggers the process of clearing the call.

In step 402, the originating MSCe 17 sends a PS protocol message, which is a SIP BYE message per IETF-2, to a Serving MSCe 45. This PS protocol message also includes a CS protocol message, which is a REL message per SS7 encapsulated within it. That is, the SS7 signal message is mapped to the PS protocol signal message by a mapper. Accordingly, by being able to handle both CS protocol and PS protocol messages, the MSCe's 17 and 45 perform interworking functions between the two types of core network, that is each acts as an interworking engine.

In step 403, upon receiving the BYE message, the serving MSCe 45 sends a PS protocol message, which is a Service Release message per 3GPP2-3, to the BS 49 to instruct a BS 49 to release the call control transaction associated with a service.

In step 404, the BS 49 releases a service option connection identifier, a terrestrial circuit, if allocated for the associated service, and send a PS protocol message, which is a Service Release Complete message per 3GPP2-3, to the serving MSCe 45.

In step 405, upon receiving the BYE message, the serving MSCe 45 sends the serving MGW 47 a PS protocol device control format message to remove terminations. This PS protocol message is a Megaco message consisting of two SUBTRACT commands per IETF-8. The first SUBTRACT command removes a termination to a BS communication channel (for example, DS0 on T1 or E1 line). The second SUBTRACT removes a termination for a bearer channel using RTP.

In step 406, the serving MGW 47 replies to the Megaco message with a PS protocol device control format message, which is a Reply message per IETF-8.

In step 407, upon receiving the Service Release Complete message (see Step 404) and upon receiving a Reply message (see Step 406) the Serving MSCe 45 sends a 200 OK message to the originating MSCe 17. This message acknowledges the BYE message (see Step 402).

In step 408, after sending the BYE message, the originating MSCe 17 sends the Originating MGW 7 a PS protocol message in device control format, which is a Megaco message consisting of two SUBTRACT commands per IETF-8. The first SUBTRACT command removes a termination to a PSTN communication channel (for example, DS0 on T1 or E1 line). The second SUBTRACT removes a termination for a bearer channel using RTP.

In step 409, the originating MGW 7 replies to a Megaco message with a PS protocol, in device control format, which is a Megaco Reply message.

In step 410, the originating MSCe 17 sends a CS protocol message, which is an RLC message per SS7, to the CS network, in this case, the PSTN 44, to cause the PSTN 44 to clear the call. This completes the call clearing process.

Of course, the present invention is not limited to any particular communication technology for the PS network or RAN. For example, the present invention is applicable to CDMA, GSM, TDMA, UMTS communication technology and wired systems as well.

It is understood that the present invention may take many forms and embodiments. Accordingly, several variations may be made in the foregoing without departing from the spirit or the scope of the invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A telecommunications system comprising:
a first functional entity comprising a mobile gateway and a second functional entity comprising a mobile switching control emulator (MSCe) in first packet switched (PS) network; and
a third functional entity comprising a mobile gateway and a fourth functional entity comprising an MSCe in a second PS network;
said first functional entity and said second functional entity including means for communicating signals using a first PS protocol;
said third functional entity and said fourth functional entity including means for communicating signals using the first PS protocol;
said first functional entity having means for communicating packet data to and from said third functional entity;
said second functional entity having means for mapping a circuit switched (CS) network message to a first PS protocol signal message using a second PS protocol;
said second functional entity further having means for transmitting the first PS protocol signal message to said fourth functional entity using a second PS protocol;
said fourth functional entity further including means for communicating the CS network message using a CS protocol to and from a CS network to terminate the CS communication; and
said second functional entity further including means for communicating a signal using a third PS protocol to and from an access network.

2. The system defined in claim 1, wherein said CS network comprises a public switched telephone network.

3. The system defined in claim 1, wherein said second functional entity comprises means for receiving a trigger signal requesting termination of the CS communication.

4. The system defined in claim 3, wherein said trigger signal is a clear signal from the access network.

5. The system defined in claim 3, wherein said trigger signal is a service release signal from the fourth functional entity using the second PS protocol.

6. The system defined in claim 1, wherein said first PS protocol comprises Megaco protocol.

7. The system defined in claim 1, wherein said second PS protocol comprises SIP protocol.

8. The system defined in claim 1, wherein said CS protocol comprises an open-standards communications protocol.

9. The system defined in claim 8, wherein said CS protocol includes an SS7 REL signal.

10. The system defined in claim 8, wherein said CS protocol includes an SS7 RLC signal.

11. The system defined in claim 1, wherein said means for said second functional entity to communicate signals to and from said fourth functional entity comprises an SIP BYE signal.

12. The system defined in claim 1, wherein said means for said second functional entity to communicate signals to and from said fourth functional entity comprises an SIP OK signal.

13. The system defined in claim 1, wherein said third PS protocol comprises IOS protocol.

14. The system defined in claim 1, wherein said means for mapping the CS communication to the first PS protocol signal message includes means for encapsulating the CS communication within the first PS protocol signal message using the second PS protocol.

15. A method for terminating a communication, the method comprising:
communicating a first signal from a first functional entity in a first network to an access network using a first packet switched (PS) protocol;
communicating a second signal from said first functional entity to a second functional entity in said first network using a second PS protocol;
receiving a third signal from said second functional entity by said first functional entity;
mapping a circuit switched (CS) communication in a CS protocol to a fourth signal, wherein the fourth signal comprises the second PS protocol signal in a third PS protocol;
communicating the fourth signal from said first functional entity to a third functional entity in a second network using the third PS protocol, the second network coupled to a CS network; and
communicating a fifth signal from the third functional entity in the second network to the CS network using the CS protocol.

16. The method defined in claim 15 further comprising communicating a fifth signal to the CS network, wherein the CS network comprises a public switched telephone network.

17. The method defined in claim 15 further comprising receiving by said first functional entity, a trigger signal requesting termination of a CS communication.

18. The method defined in claim 17, wherein said trigger signal includes a clear signal.

19. The method defined in claim 17, wherein said trigger signal includes a service release signal.

20. The method defined in claim 15, wherein said second signal comprises a Megaco subtract trunk signal and a subtract RTP signal.

21. The method defined in claim 15, wherein said third signal comprises a Megaco reply signal.

22. The method defined in claim 15 further comprising communicating signals to and from said CS network using an open-standards CS protocol.

23. The method defined in claim 22, wherein said CS protocol includes an SS7 REL signal.

24. The method defined in claim 22, wherein said CS protocol includes an SS7 RLC signal.

25. The method defined in claim 15, further comprising communicating an SIP BYE signal from said first functional entity to said third functional entity.

26. The method defined in claim 15, further comprising communicating an SIP OK signal from said first functional entity to said third functional entity.

27. A system operable in a first packet switched (PS) network comprising a first mobile switching control emulator (MSCe) for call clearing in a second PS network comprising a second MSCe and a circuit switched (CS) network, the system comprising:
the first MSCe configured for:
receiving from an access network a first signal to trigger initiation of a call clearing action over a first PS protocol;
transmitting a second signal over the first PS protocol to the access network, the second signal relating to clearing the call;

mapping a third signal from the first PS protocol to a second PS protocol, resulting in a fourth signal;

transmitting the fourth signal over a second PS protocol to a media gateway requesting subtraction of a trunk line and subtraction of an RTP bearer channel;

receiving a fifth signal over the second PS protocol from the media gateway;

mapping a sixth input signal from the first PS protocol to a third PS protocol resulting in a seventh signal, wherein the seventh signal comprises a circuit switched (CS) communication mapped into the third PS protocol;

transmitting the seventh signal over the third protocol to the second MSCe; and receiving an eighth signal over the third protocol from the second MSCe relating to the clearing of the call.

28. The system of claim 27, wherein the first PS protocol comprises IOS protocol.

29. The system of claim 27, wherein the first signal comprises a Clear Request.

30. The system of claim 27, wherein the second PS protocol comprises Megaco protocol.

31. The system of claim 27, wherein the fifth signal comprises a reply to the fourth signal.

32. The system of claim 27, wherein the third PS protocol response comprises SIP protocol.

* * * * *